Patented Jan. 30, 1945

2,368,510

UNITED STATES PATENT OFFICE 2,368,510

MULTIPLE BASE EXCHANGE SILICATES

Charles C. Winding, Ithaca, N. Y., assignor to Tide Water Associated Oil Company, Bayonne, N. J., a corporation of Delaware No Drawing. Application April 25, 1941,
Serial No. 390,331

3 Claims. (Cl. 23—110)

This invention relates to silicate compositions and methods of preparing the same. More particularly, it relates to active adsorbent silicate compositions having special utility in the decolorization of hydrocarbon oils and in other refining operations. Methods of refining oils with such materials are included in the scope of the invention.

The method for preparing the silicate compositions of the invention involves "multiple cation exchange reactions" employing as starting material a metal silicate having suitable physical properties. Cation exchange reaction comprises treatment in solid form of a silicate of a particular metal with an aqueous solution of a salt of another metal to exchange ions of the metal of said silicate with cations of the said salt. This reaction is conducted by preparing a slurry of finely divided metal silicate in a solution of a salt of the metal to be exchanged of concentration such that more equivalents of the latter-named metal are present than equivalents of the metal of the said solid silicate, and agitating the slurry at an elevated temperature, preferably 80° to 90° C. The composition resulting from this treatment will comprise both the metal silicate starting material and silicate of the metal of the treating salt in varying proportions. Such compositions so produced will be termed herein "exchange metal silicates." For example, a composition resulting from cation exchange reaction in which a solid calcium silicate composition is slurried with a magnesium salt solution to effect cation exchange of calcium ions of the calcium silicate with magnesium ions will be called "exchange magnesium silicate." I have found, in accordance with the present invention, that by a process comprising repetition of the cation exchange reaction, i. e., exchanging ions of the original silicate with those of a second metal, then exchanging ions of the metal of the resulting silicate with ions of a third metal or of the metal of the original silicate and so on, always exchanging different metals in any one exchange, an exchange silicate composition is obtained as a final product having an oil decolorizing activity higher than that of the original silicate starting material and usually higher than all of the preceeding exchange metal silicates produced in the process. This final product resulting from such process will be herein designated "multiple exchange silicate" and the repeated cation exchange reaction will be termed "multiple exchange reaction."

The utility and importance of the multiple exchange reaction is indicated by the fact that metal silicates having some degree of activity can be thereby converted to silicate compositions of higher activity. Likewise, silicates having no appreciable activity can be converted to active compositions. Active barium silicate compositions and active calcium silicate compositions, as well as active magnesium silicate compositions, have been so prepared. The procedure in conducting each cation exchange reaction of the described multiple exchange process may vary. It is usually desirable at each exchange stage to remove the spent liquid of the first slurry after the treatment described above, add fresh metal salt solution and repeat the treatment; or, if desired, a counter-current flow method may be used in which fresh metal salt solution is continuously added, the salt solution being flowed countercurrently with the solid silicate, with continuous removal of spent salt solution from the process.

Regarding the starting material to be used in the multiple exchange reaction artificially precipitated metal silicates are desirable, particularly when the final multiple exchange silicate product is to be employed as decolorizing adsorbent in the refining of lubricating oils. By using specially prepared starting materials of this type, desirable physical properties will result in the final product. The physical properties of the final exchange silicate product may to some extent be regulated or controlled by the conditions maintained during precipitation of the original silicate starting material. However, the invention is not intended to be limited to the use of artificially precipitated starting materials since any metal silicate starting material from which there can be prepared an active adsorbent by the multiple exchange process is contemplated.

The following examples illustrate the method of the invention in certain specific embodiments in the production of various multiple exchange silicates from various starting materials.

EXAMPLE I

Two solutions were prepared, the first consisting of 1590 c. c. of water solution of calcium chloride in 0.3 molar concentration and the second consisting of 1590 c. c. of water solution of sodium silicate (ratio of $SiO_2$ to $Na_2O$ = 3.9 to 1) in 0.3 molar concentration based upon the $Na_2O$ content thereof. Both solutions were heated to 95° C. and while at this temperature the first was added to the second over a period of one to two minutes with mechanical stirring. Stirring was continued for a total of ten minutes at about 90° C. The resulting slurry containing precipitate of calcium silicate was filtered and dried at 120° C. for 22½ hours. The dried filter cake was then broken up, the resulting material being a finely divided powdery substance.

133 grams of this calcium silicate material were then subjected to a cation exchange reaction to exchange calcium ions thereof with magnesium ions, by agitating the same in 1114 c. c. of 0.5 molar magnesium chloride solution at 80° to 90° C. for one hour, then decanting the liquid, adding to the solid material a fresh magnesium chloride solution of the stated strength and in the stated amount and agitating the resulting slurry in like manner for one hour at 80° C. to 90° C. Then the slurry was filtered and the resulting filter cake of exchange magnesium silicate was washed with water and dried for 16 hours at 120° C.

The dried filter cake of exchange magnesium silicate was broken up and the resulting material subjected to a cation exchange reaction by agitating 85 grams thereof in 680 c. c. of 0.5 molar calcium chloride solution for one hour at 80° C. to 90° C., decanting the liquid, adding 680 c. c. of fresh 0.5 molar calcium chloride and repeating the operation. The slurry was then dried at 120° C. for 16 hours, and the dried filter cake of exchange calcium silicate which was then broken up.

The resulting exchange calcium silicate was then subjected to cation exchange reaction by agitating 50 grams thereof with two successive batches of 0.5 molar magnesium chloride solution of 400 c. c. each using one hour agitation periods at 80° to 90° C. as before. The slurry was filtered and dried. This final product of multiple exchange magnesium silicate, the intermediate exchange silicate and the precipitated calcium silicate starting material were each tested for effectiveness as contact adsorbents in the decolorization of mineral lubricating oils.

The test consisted in agitating 45 grams of the adsorbent to be tested in finely divided condition with 300 grams of an undewaxed Pennsylvania lubricating oil stock of 26.1 gravity, 50° F. pour point, 550° F. flash (closed cup) and 147 seconds Saybolt viscosity at 210° F., in a substantially closed vessel for 20 minutes at a temperature of 400° F. The suspension was then filtered and the color of the treated oil was measured by the optical density method. The O. D. (optical density) numbers were determined by the method of Ferris & McIlvain described in Industrial and Engineering Chemistry, analytical edition 6, 23 (1934), except that a Bausch and Lomb monochromatic green filter was used as a source of monochromatic light.

The results of the test are tabulated in the following table, which shows in terms of O. D. values the color of the oil samples treated with the respective materials shown. The color of the untreated test oil was 2620 O. D. Lower O. D. values indicate the more highly decolorized oil.

Table I

| Material | Color of treated oil, (O. D.) |
|---|---|
| Example I starting material (ppt. calcium silicate) | 1,620 |
| 1st exchange magnesium silicate | 655 |
| Exchange calcium silicate | 680 |
| Final product (multiple exchange mag. silicate) | 570 |

EXAMPLE II

Magnesium silicate was precipitated by adding 2000 c. c. of 0.4 molar magnesium chloride solution at 95° C. to 2000 c. c. of a solution of the sodium silicate of Example I in 0.4 molar (as to Na₂O) concentration also at 95° C., agitating for 10 minutes at 85° C. and filtering as described in Example I. The filter cake was dried at 115° C. for 19 hours and then broken up, resulting in a fine powdery material.

200 grams of this material were agitated with two successive batches of 1600 c. c. of 0.5 molar calcium chloride solution under the conditions and in the manner described in the cation exchanges in Example I. After filtering and drying for 20 hours at 115° C. the resulting exchange calcium silicate was subjected to cation exchange in similar manner, using 125 grams of the latter to 1000 c. c. of 0.5 molar magnesium chloride and repeating the operation with fresh solution, as before. The filtered material was dried at 115° C. for 20 hours and 85 grams of this exchange magnesium silicate was subjected to cation exchange in similar manner, using two successive batches of treating solutions each consisting of 680 c. c. of 0.5 molar calcium chloride solution. This slurry was filtered and the resulting exchange calcium silicate dried at 115° C. for 20 hours. 50 grams of the latter material were subjected to cation exchange in similar manner, using two successive treating solutions each consisting of 400 c. c. of 0.5 molar concentration magnesium chloride solution. The resulting slurry was filtered and dried at 115° C. for 21 hours, the dried material constituting the multiple exchange magnesium silicate final product was then tested, as were the intermediate and starting materials, for decolorizing activity by the described test procedure. Test data appear in Table II.

Table II

| Material | Color of treated oil, (O. D.) |
|---|---|
| Starting material (pptd. mag. silicate) | 800 |
| 1st exchange calcium silicate | 730 |
| 1st exchange magnesium silicate | 680 |
| 2nd exchange calcium silicate | 680 |
| Final product (multiple exchange magnesium silicate) | 660 |

EXAMPLE III

In this example multiple exchange calcium silicate is produced from precipitated barium silicate starting material.

The barium silicate was precipitated by adding to 1450 c. c. of a solution of the sodium silicate set forth in Example I in 0.4 molar (as to Na₂O) concentration, 1450 c. c. of 0.4 molar barium chloride solution, both solutions being at 95° C., and agitating, the precipitation procedure and conditions being otherwise the same as set forth in Example I. The slurry was filtered and the precipitate dried at 120° C. for 21 hours. The dried filter cake was broken up and 100 grams of the resulting finely divided powdery material were agitated at 80–90° C. for one hour with each of two successive solutions, each of which consisted of 800 c. c. of 0.5 molar magnesium chloride solution to produce an exchange magnesium silicate. The slurry was filtered and the solid material dried for 20 hours at 120° C.

45 grams of this material were then similarly treated with two successive batches of solution each consisting of 400 c. c. of 0.5 molar calcium chloride solution to produce as the final product multiple exchange calcium silicate. The slurry was filtered and dried at 120° C. for 20 hours.

Upon testing this final product and the starting and intermediate materials produced by the above described test, the results tabulated in Table III were obtained.

Table III

| Material | Color of treated oil, (O. D.) |
| --- | --- |
| Starting material (ppt'd. barium silicate) | 2,100 |
| Exchange magnesium silicate | 848 |
| Multiple exchange calcium silicate final product | 765 |

EXAMPLE IV

In this case precipitated magnesium silicate was employed as starting material to produce as a final product an active multiple exchange barium silicate.

The magnesium silicate was precipitated by adding 2680 c. c. of 0.4 molar magnesium chloride solution at 95° C. to 2680 c. c. of a solution of the sodium silicate described in Example I in 0.4 molar concentration (as to Na2O) also at 95° C., and agitating the resulting mass at 90° C. for a total of 10 minutes time. The slurry was filtered and the precipitate dried for 24 hours at 120° C. Upon breaking up the dried filter cake a fine powdery material resulted.

100 grams of this material were agitated for one hour at 80–90° C. with two successive solutions, each consisting of 800 c. c. of 0.5 molar calcium chloride solution, the resulting slurry filtered and the solid material dried at 120° C. for 18 hours.

50 grams of the resulting exchange calcium silicate were then agitated for one hour at 80–90° C. with two successive solutions, each consisting of 400 c. c. of 0.5 molar barium chloride solution, to produce multiple exchange barium silicate final product.

When tested for oil decolorizing effectiveness by the test set forth hereinabove, the final product, starting material and intermediate exchange silicates gave the results tabulated hereinbelow.

Table IV

| Material | Color of treated oil, (O. D.) |
| --- | --- |
| Starting material (ppt'd. mag. silicate) | 965 |
| Exchange calcium silicate | 790 |
| Multiple exchange barium silicate, final product | 790 |

I claim:

1. Method for increasing the adsorbent activity of a magnesium silicate which comprises contacting the same with hot calcium chloride solution having an excess of calcium equivalents over equivalents of magnesium of the said magnesium silicate whereby to produce an exchange calcium silicate, then contacting said exchange calcium silicate with hot magnesium chloride solution having an excess of magnesium equivalents over equivalents of calcium of the said exchange calcium silicate.

2. Method for increasing the adsorbent activity of a magnesium silicate composition which comprises contacting the same with an aqueous solution containing calcium ions to exchange magnesium ions with calcium ions whereby to produce an exchange calcium silicate composition, then contacting said calcium silicate composition with an aqueous solution containing magnesium ions to exchange calcium ions thereof with magnesium ions.

3. Method for increasing the adsorbent activity of a silicate composition containing at least one of the silicates of barium, calcium and magnesium which comprises replacing at least one of said metals with a different metal selected from the group consisting of barium, calcium and magnesium by cationic exchange reaction to produce an intermediate silicate composition, and replacing metal of said intermediate silicate composition with a different metal from the group consisting of barium, calcium and magnesium by cationic exchange reaction to produce a silicate composition of higher adsorbent activity than that of the original silicate composition starting material.

CHARLES C. WINDING.